United States Patent [19]
Armstrong

[11] 3,964,601
[45] June 22, 1976

[54] POSITIVE FLOW VIBRATORY FEEDER
[75] Inventor: Jack W. Armstrong, Baldwinsville, N.Y.
[73] Assignee: Lipe-Rollway Corporation, Syracuse, N.Y.
[22] Filed: July 18, 1975
[21] Appl. No.: 597,010

Related U.S. Application Data
[63] Continuation-in-part of Ser. No. 481,125, June 20, 1974, abandoned.

[52] U.S. Cl. .......................... 198/220 BA; 198/227
[51] Int. Cl.² .................................... B65G 27/00
[58] Field of Search ............ 198/220 BA, 227, 279; 46/1 C

[56] References Cited
UNITED STATES PATENTS

| | | | |
|---|---|---|---|
| 3,667,590 | 6/1972 | Mead | 198/220 BA |
| 3,789,711 | 2/1974 | Mead | 198/220 BA |
| 3,882,993 | 5/1975 | Mead | 198/220 BA |

Primary Examiner—Evon C. Blunk
Assistant Examiner—Jeffrey V. Nase
Attorney, Agent, or Firm—Stonebraker, Shepard & Stephens

[57] ABSTRACT

A positive flow vibratory feeder uses a support element extending along a feed path and vibrated in a plane perpendicular to the support element and extending along the feed path. The support element is covered with a feed pile material having resilient bristles of uniform length uniformly inclined toward the direction of feed from a plane generally perpendicular to the support element and transverse to the support element. A fixed holder generally parallel with the support element and spaced from the feed pile material is covered with pile material having resilient bristles of uniform length extending toward the feed pile bristles. The tips of the holding pile bristles are spaced from the tips of the feed pile bristles by slightly less than the thickness of the objects being fed to hold the objects in engagement with the tips of the feed pile bristles during vibration, and the holding pile bristles are inclined toward the direction of feed to cooperate with the feed pile bristles to produce a positive flow for said objects.

16 Claims, 10 Drawing Figures

POSITIVE FLOW VIBRATORY FEEDER

RELATED APPLICATIONS

This is a continuation-in-part of my copending parent application, Ser. No. 481,125, filed June 20 1974, entitled POSITIVE FLOW VIBRATORY FEEDER, and abandoned upon the filing of this application.

THE INVENTIVE IMPROVEMENT

Vibratory feeders using an inclined bristle pile material are known to produce higher speed feed rates and more forceful feeding. However, they are limited to horizontal conveying, or movement of objects along slight inclines either upward or downward. The invention involves recognition of the reasons why vibratory pile feeders have not been able to feed objects up steep inclines, and in attempting to make this possible, the invention recognizes a way that the feeding speed and force can be substantially increased for vibratory pile feeders. The invention accomplishes a positive flow of objects up a steep incline or even up a vertical incline and also accomplishes object feeding at substantially greater speeds and feed pressure than was previously possible for vibratory pile feeders. The invention generally aims at increased versatility as to inclination or direction of feed, increased feeding speed and force, and positive flow control of objects fed on vibratory pile feeders with general simplicity, economy, and reliability.

SUMMARY OF THE INVENTION

The inventive positive flow vibratory feeder is for objects having substantially uniform thickness. It includes a base and a support element extending along a feed path, with a vibrator mounted on the base for vibrating the support element in a plane generally perpendicular to the plane of the support element and extending along the feed path. The support element is covered with a feed pile material along the feed path, and the feed pile material has resilient bristles of uniform length uniformly inclined by 5° to 25° toward the direction of feed from a plane generally perpendicular to the plane of the support element and transverse to the support element. The vibration direction of the support element is inclined toward the direction of feed between the plane of the support element and the transverse plane, and a holder fixed to the base is generally parallel with the support element and spaced from the feed pile material. The holder has a pile material having resilient bristles of uniform length extending toward the feed pile bristles, and the tips of the holding pile bristles are spaced from the tips of the feed pile bristles by slightly less than the thickness of the objects to hold the objects in engagement with the tips of the feed pile bristles during vibration. The holding pile bristles are inclined toward the direction of feed to flex periodically as the objects move against the holding pile bristles on one stroke of the vibration and to urge the objects periodically toward the feed pile bristles on the other stroke of the vibration to produce positive flow of the objects.

DRAWINGS

DETAILED DESCRIPTION

Figure 1:
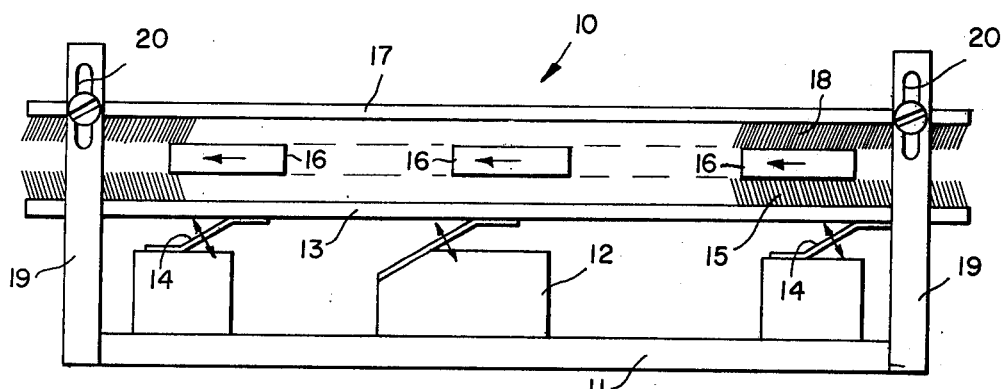
FIG. 1 is a partially schematic, side elevational view of a preferred embodiment of the inventive positive flow vibratory feeder.

The invention was conceived in an attempt to devise a vibratory pile feeder that would convey objects up a steep incline, and in thinking about this problem, it was recognized that one of the factors limiting the incline of a vibratory pile feeder is the fact that the objects being fed begin to bounce off the bristle tips as the support element vibrates and then skid or roll back down the incline. Also, if the vibrational amplitude of a horizontal vibratory pile feeder is made too large, objects begin to bounce off the bristle tips rather than moving swiftly along the conveyor as they do at lower vibrational amplitudes. This realization led to a holder having inclined pile material for holding the objects in engagement with the feed pile material so the objects could not bounce away from the tips of the feed pile bristles during vibration, and the results were quite surprising. It was found that objects could be fed not only up steep inclines, but vertically straight upward, and also that objects fed along a horizontal path could be vibrated with an amplitude greater than usual to achieve substantially greater feeding speed and force than was otherwise possible. Also, with holding pile positioned over the feeding pile, a vibratory pile feeder can be inclined downwardly and still feed objects along at the desired speed without bouncing or tumbling them rapidly down the conveyor. The result was a positive flow vibratory feeder that better controls the feeding movement, increases the feeding speed and force applied to the objects, and allows high speed and positive flow both upwardly or downwardly at steep or vertical inclinations, as well as improved feeding speed and force in the horizontal plane. The ways to achieve these advantages are illustrated schematically in the drawings and described below.

Positive flow feeder 10 of FIG. 1 includes a base 11 supporting a vibrator 12 for vibrating a support element 13 also supported on resilient legs 14 for a generally reciprocal vibration in a vertical plane in the direction of the arrows. Support element 13 carries a feed pile material 15 on its upper surface to form a feed path for objects 16 moving in the direction of the arrows as support element 13 vibrates. A holder 17 generally parallel with support element 13 is spaced from feed pile material 15 and carries holding pile material 18 engaging the upper surfaces of objects 16.

The bristles of feed pile 15 are of uniform length and are uniformly inclined by 5° to 25° from a plane generally perpendicular to the plane of support element 13 and transverse to support element 13. Such inclination of bristles 15 establishes the direction of feed for objects 16. The vibration direction of support element 13 is in a plane generally perpendicular to the plane of support element 13 and extending along the longitudinal feed path of support element 13, and the vibration direction is inclined toward the direction of feed by preferably 5° to 20° from a plane perpendicular to the plane of support element 13 and transverse to support element 13. The vibration angle produced by vibrator 12 is also preferably within 10° of the inclination angle of pile bristles 15.

Holding pile bristles 18 are also inclined toward the direction of feed by preferably 5° to 25° from a plane perpendicular to the holder 17 and transverse to holder 17. Holding bristles 18 are also resilient and have both uniform length and inclination. The tips of holding bristles 18 are spaced from the tips of feed bristles 15 by slightly less than the thickness of objects 16 to hold objects 16 in engagement with the tips of feed bristles 15 during the vibration of support element 13.

Figure 2:
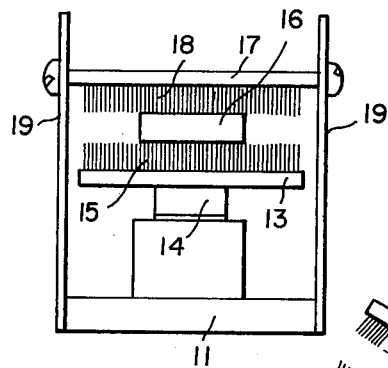
FIG. 2 is an end elevation of the feeder of FIG. 1.

In the embodiment of FIGS. 1 and 2, holder 17 is fixed relative to base 11 and is supported on arms 19 for vertical adjustment in slots 20. This allows holder 17 to be raised and lowered relative to support element 13 for proper adjustment of the distance between the tips of bristles 18 and 15. support element 13 then moves toward and away from relatively fixed holder 17, and the adjustment between support element 13 and holder 17 is preferably such that the tips of bristles 18 and the tips of bristles 15 always engage objects 16 even when elements 13 and 17 are spaced furthest apart in the vibration cycle.

As support element 13 moves upward on the vibrational upstroke, bristles 15 flex under objects 16 and lift objects 16 to press against resilient bristles 18 on holder 17 so that the combined effect of bristles 15 and 18 is to move objects 16 forward. Then, as support element 13 moves downward on the vibrational downstroke, the energy stored in flexed bristles 18 helps push objects 16 back down into engagement with bristles 16 to prevent any bouncing of objects 16. The net result is a much faster and more powerful feed than could be achieved without holder 17 and holding bristles 18. Bristles 15 and 18 can also interact as ratchets having a lower coefficient of friction in the feed direction than in the reverse direction to prevent slipping of objects backward after an advance.

Pile bristles 18 can be formed of a different material from pile bristles 15, and for many applications pile bristles 18 are preferably substantially more resilient and more easily flexed than relatively stiffer feed pile bristles 15. Bristle materials 15 and 18 can also be formed with different bristle lengths and densities, different bristle diameters, and with bristles formed of different materials for varying degrees of stiffness and resilience to accommodate objects of different sizes and masses.

Figure 3:
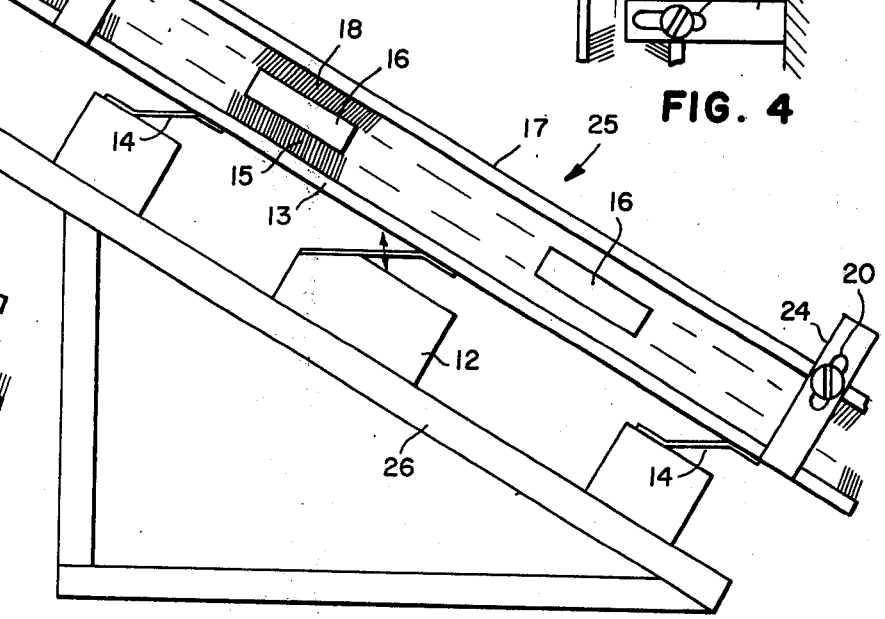
FIG. 3 is a partially schematic, side elevational view of another preferred embodiment of the inventive positive flow feeder inclined steeply upward for elevating objects.

Feeder 25 of FIG. 3 is similar to feeder 10, except for being inclined steeply upward by inclined base 26 and for having holder 17 adjustably supported on arms 24 secured to support element 13 for vibrational movement with support element 13. Holder 17 then vibrates directly with support element 13, and the space between holder 17 and support element 13 is adjustable by means of slots 20. Objects 16 are then thrust back and forth as support element 13 and holder 17 vibrate for alternately flexing feed bristles 15 and holder bristles 18 to achieve a positive and forceful movement of objects 16 up the incline of feeder 25. The fixed holder 17 of feeder 10 and the vibrational holder 17 of feeder 25 each work very well and each have advantages for specific mountings and specific objects 16 to be fed.

Figure 4:
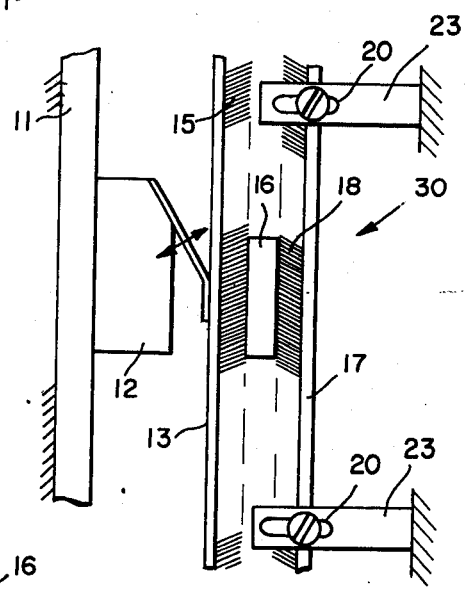
FIG. 4 is a partially schematic, side elevational view of another preferred embodiment of the inventive feeder inclined vertically upward for elevating objects.

Feeder 30 of FIG. 4 is similar to feeders 10 and 25, except for being vertically oriented as illustrated to feed objects 16 vertically straight upward, and except for holder 17 being relatively fixed on arms 23 and adjustable in slots 20 relative to support element 13. The vibrational mounting of holder 17 as shown in feeder 25 is also effective in feeding objects 16 vertically straight upward. For steeply inclined and vertically inclined feeders, the adjustment between holder 17 and support element 13 preferably brings the tips of feed bristles 15 and holding bristles 18 close enough together to prevent objects 16 from skidding or sliding downward in the feeder either during operation or when the feeder is stopped. Feeders 10, 25, and 30 can also be oriented for a downward incline and operate to move objects 16 at a positive flow rate without the objects moving or sliding ahead of the normal operating flow rate of the feeder. This has the advantage of directing a supply of objects 16 downwardly without tumbling or spilling the objects and with the capacity for stopping the ojects in place when the feeder is stopped.

Figure 5:
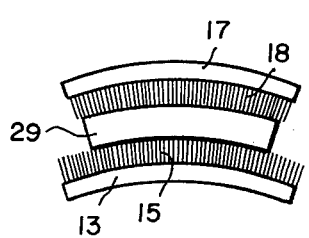
FIG. 5 is a fragmentary, end elevational view of the feed pile and holding pile portion of another preferred embodiment of the inventive feeder.

FIG. 5 schematically suggests that holder 17 and support element 13 can have transverse configurations to fit different shapes of objects 29 for feeding. Concave, convex, and other transverse shapes can be made to fit particular objects so long as the tips of the feed pile bristles 15 and the tips of the holding pile bristles 18 are shaped to fit at least a substantial portion of the respective opposite surfaces of the object. Many other examples of transverse shapes to fit other objects are also possible, and FIG. 5 merely illustrates the general concept of shaping holder 17 and support element 13 to fit different shaped objects.

Figure 6:
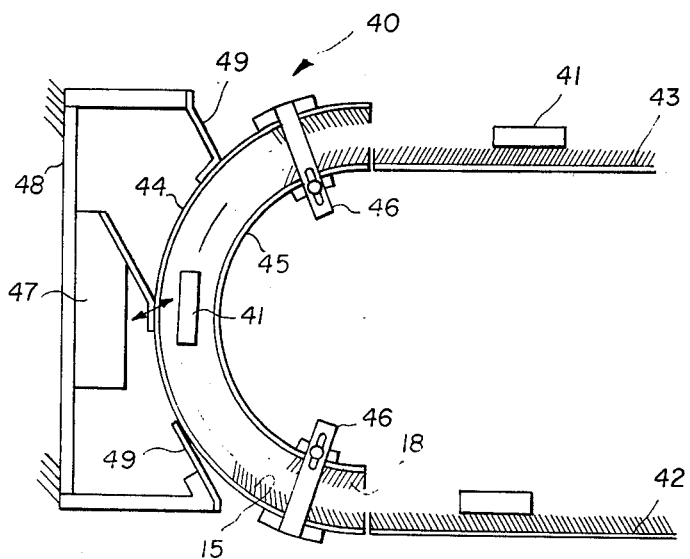
FIG. 6 is a partially schematic, side elevational view of another preferred embodiment of the inventive feeder curving upward through an arc for turning over objects.

Feeder 40 of FIG. 6 receives objects 41 from a lower feeder 42 and directs objects 41 in an upwardly curving arc of about 180° onto upper feeder 43 for turning over objects 41. Feeder 40 can also be inverted for receiving objects from an upper level and feeding them in a controlled positive flow to a lower level for turning over the objects. The arcuate portion of feeder 40 includes a curved support element 44 and a correspondingly curved holder 45 adjustable in slotted brackets 46 relative to support element 44 so that objects 41 travel through the curvature of feeder 40 under the combined impetus of feed pile 15 and holding pile 18.

Support element 44 and holder 45 are vibrated together by a vibrator 47 mounted on a fixed bracket 49 having resilient arms 49 supporting feeder 40 for the preferred vibration as indicated by the arrows. Holder 45 preferably vibrates with support element 44 as illustrated to help advance objects 41 near the output end of feeder 40 where objects 41 rest more on holding pile material 18 than on feed pile material 15, and where the respective roles of piles 15 and 18 are reversed. Pile materials 15 and 18 are preferably selected with this in mind so that objects 41 are fed under controlled positive flow satisfactorily at both the input and output ends of feeder 40.

Figure 7:
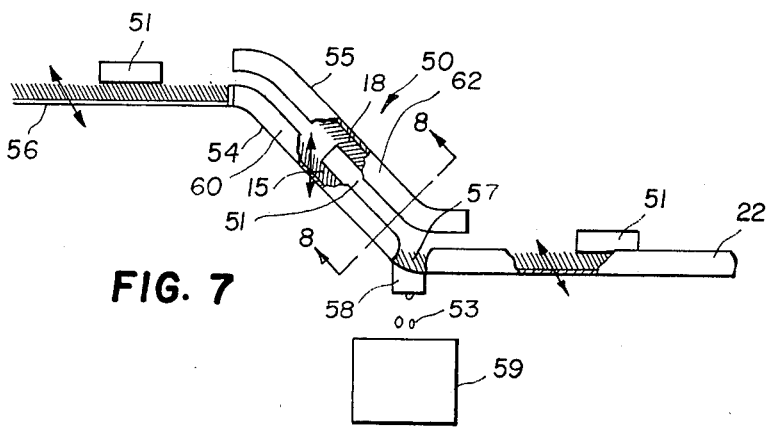
FIG. 7 is a partially schematic, side elevational view of another preferred embodiment of the inventive feeder inclined vertically upward and having a discharge passageway for material mixed in with objects being fed.
Figure 8:
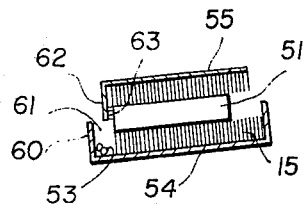
FIG. 8 is a cross-sectional view of the feeder of FIG. 7 taken along the line 8—8 thereof.

Feeder 50 of FIGS. 7 and 8 receives objects 51 moved along a horizontal conveyor 52 along with waste or scrap material or other objects 53 thinner than objects 51. Support element 54 and holder 55 are inclined steeply upward from conveyor 52 to convey objects 51 to upper conveyor 56, but thinner material 53 is not thick enough to bridge the gap between the tips of feed pile bristles 15 and holding pile bristles 18 and hence cannot make the grade. Feeder 50 thus acts as a separator allowing objects 51 to pass onto upper level 56 and placing an unascendable steep grade in the way of smaller objects 53 which then gravitate to the bottom of the grade and are discharged through a discharge passageway 57 to a discharge chute 58 and into a container 59.

to facilitate the discharge of material 53, feeder 50 is preferably transversely tilted downward toward a side rail 60 and is clear of pile material 15 along a side channel 61 extending along side rail 60. Holder 55 has a side rail 62 extending downward above channel 61 to engage the upper edge of objects 51 and hold objects 51 on pile material 50 alongside clear channel 61. Side rail 62 of holder 55 is preferably faced with a wear material such as a relatively short-bristled pile material 63 or a resin coating to withstand the wear of objects 51 moving along in engagement with side rail 62. Objects 53 or other waste or scrap material are small enough to fit under side rail 62 and fall into channel 61 and they gravitate toward channel 61 because of the transverse tilt of feeder 50. Material 53 then falls down channel 61 and spills out of discharge passageway 57 at the bottom of the incline of feeder 50. Feeder 50 then effectively sorts out smaller material 53 while allowing thicker objects 51 to move on, and does so in a simple efficient manner without any slowdown or need for other operations.

Several experiments made since the original application was filed have produced new information about the invention and have resulted in new preferences for its construction and operation. These are explained below relative to FIGS. 9 and 10.

Figure 9:
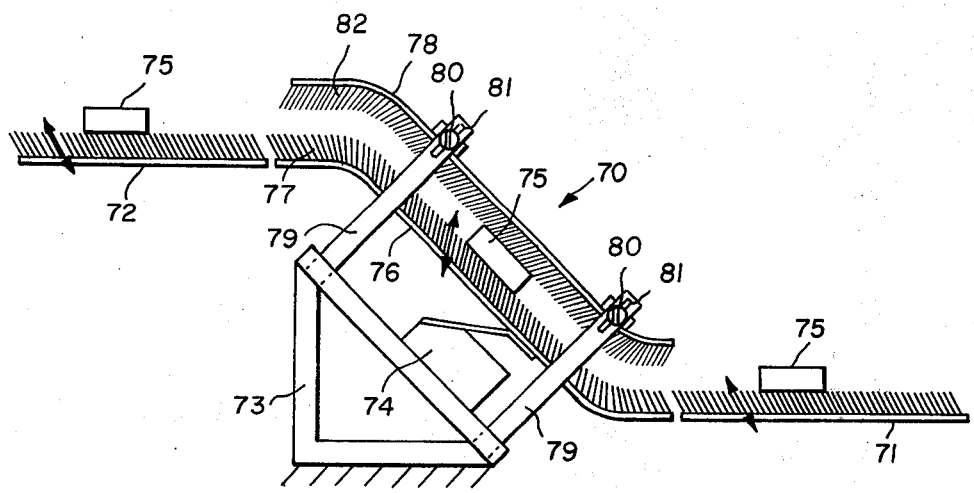
FIG. 9 is a schematic, side elevational view of another preferred embodiment of the inventive feeder having a steep upward incline.

Feeder 70 of FIG. 9 is arranged between a conventional vibratory pile feeder 71 on a lower level, and another conventional vibratory pile feeder 72 on an upper level, and feeder 70 moves objects 75 upward from feeder 71 to feeder 72. Feeder 70 includes a base 73 supporting a vibrator 74 that vibrates support element 76 reciprocally in the direction shown by the double-headed arrow. Support element 76 extends in the feed direction and lies in a first plane that extends along the linear central extent of support element 76. The vibration produced by vibrator 74 is in a second plane perpendicular to the first plane and also extending in the direction of feed, and the inclination of the vibration direction is between the first plane of support element 76 and a third plane transverse to support element 76 and perpendicular to both the first and second planes. Support element 76 is covered with a bristle pile material 77 having bristles inclined toward the direction of feed as described above, and the bristles of pile material 77 are resilient and strong enough to support objects 75 on their tips.

A holder 78 is fixed to base 73 and supported on arms 79 where it is adjustably held by screws 80 extending through slots 81. Holder 78 is generally parallel with support element 76 and lies in a fourth plane parallel with the first plane of support element 76, and holder 78 is adjustably spaced from support element 76 for positive feeding of objects 75. Holder 78 also has a holding pile material 82 having bristles inclined toward the direction of feed from the third plane so that the tips of the bristles of pile material 82 engage the tops of objects 75 as they move up the incline.

Holder 78, by being fixed to base 73, is fixed relative to support element 76, and this has several advantages. The vibrational mass that has to be driven by vibrator 74 is kept to a minimum, so that the size, power consumption, noise level, and cost of vibrator 74 are kept as low as possible. The adjustment of holder 78 relative to support element 76 is made so that the tips of the bristles of pile material 82 are pressed lightly against objects 75 at the maximum separation between holder 78 and support element 76. Then, on the vibrational upstroke of support element 76, objects 75 are raised upward against the bristles of pile material 82 to flex the bristles against objects 75, and as support element 76 moves away from holder 78 on the vibrational downstroke, the bristles of pile material 82 tend to straighten out and return from their flexed position to force objects 75 back down against the bristles of pile material 77 on support element 76. The result is surprisingly improved speed and forcefulness for producing a positive flow for objects 75.

Another improvement in feeder 70 is to make the bristles of pile material 82 substantially more resilient and flexible than the bristles of feed pile material 77. This improves the feeding speed and force and can be done by making the bristles of pile material 82 relatively thin or formed of a more resilient resin material. Use of relatively more flexible bristles in pile material 82 also makes the adjustment of the gap distance of pile material 82 from pile material 77 less critical.

Figure 10:
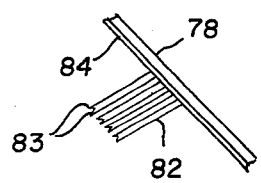
FIG. 10 is an enlarged, fragmentary schematic view of a preferred bristle material for the holding pile of the feeder of FIG. 9.

Another preference for the bristles of pile material 82 is split ends 83 as best shown in FIG. 10. One preferred way of accomplishing this is to use hollow nylon bristles having split or frayed ends 83 with the bristles mounted at the proper inclination in a base of 84 secured to holder 78. Split ends 83 then produces a greater frictional grip on the tops of objects 75, and the bristles 82 are also substantially more resilient and flexible than the bristles of the feed pile material 77 so that the combined effect of greater resilience and split ends 83 substantially enhances the feeding speed and force.

Feeder 70 can also be made to operate along a level path, a downwardly inclined path, or a path extending vertically up or down. Those skilled in the art will also appreciate many ways that the invention can be applied to various objects for increasing the feeding speed and force and producing positive flow.

I claim:
1. A positive flow vibratory feeder for objects having uniform thickness, said feeder comprising:
 a. a base;
 b. a support element extending along a feed path and lying generally in a first plane;
 c. means mounted on said base for vibrating said support element in a second plane generally perpendicular to said first plane and extending along said feed path, the direction of the vibration pro- duced by said vibrating means being at an angle between said first plane and a third plane generally perpendicular to both said first plane and said second plane and transverse to said support element;
d. said support element being covered with a feed pile material along said feed path, said feed pile material having resilient bristles of uniform length;
e. said feed pile bristles being uniformly inclined by 5° to 25° toward the direction of feed from said third plane;
f. a holder mounted on said base and fixed relative to said support element, said holder extending generally parallel with said support element in a fourth plane generally parallel with said first plane so said holder is uniformly spaced from said feed pile material;
g. holding pile material arranged on said holder and having resilient bristles of uniform length extending toward said feed pile bristles.
h. the tips of said holding pile bristles being spaced from the tips of said feed pile bristles by slightly less than said thickness of said objects to hold said objects in engagement with the tips of said feed pile bristles during said vibration; and
i. said holding pile bristles being inclined toward said direction of feed at an angle between said third plane and said fourth plane to flex periodically as said objects move against said holding pile bristles in response to one stroke of said vibration and to urge said objects periodically toward said feed pile bristles in response to the other stroke of said vibration.

2. The feeder of claim 1 wherein said support element is inclined steeply upward in said direction of feed.

3. The feeder of claim 1 wherein said support element is inclined vertically upward in said direction of feed.

4. The feeder of claim 1 wherein said holding pile bristles are substantially more resilient than said feed pile bristles.

5. The feeder of claim 1 wherein said tips of said feed pile bristles and said tips of said holding pile bristles are shaped to fit respective opposite surfaces of said objects.

6. The feeder of claim 1 wherein said vibration direction of said support element is within 10° of said fuel pile bristle inclination.

7. The feeder of claim 1 wherein said holder is adjustable relative to said support element.

8. The feeder of claim 7 wherein said holder is adjusted to prevent said objects from slipping relative to said support element.

9. The feeder of claim 1 wherein said tips of said holding pile bristles are split.

10. The feeder of claim 9 wherein said holding pile bristles are hollow.

11. The feeder of claim 9 wherein said holding pile bristles are substantially more resilient than said feed pile bristles.

12. The feeder of claim 1 wherein said support element is inclined steeply upward and includes a discharge passageway in a lower region of said support element for discharging material thinner than said objects.

13. The feeder of claim 12 wherein said support element has a side channel clear of said feed pile material and is transversely inclined downward toward said side channel for moving said thinner material down said side channel as said objects move up said support element.

14. The feeder of claim 13 wherein said holder has a side rail above said side channel for holding said objects alongside said side channel as said objects move up said support element.

15. The feeder of claim 14 wherein said side rail of said holder is faced with a pile material.

16. The feeder of claim 1 wherein said support element and said holder are curved through a vertical arc of about 180°.

* * * * *